United States Patent [19]
Warren

[11] 3,987,537
[45] Oct. 26, 1976

[54] METHOD AND APPARATUS FOR HYDROPHONE STREAMER MANUFACTURE

[75] Inventor: Noel Macon Warren, Alvin, Tex.

[73] Assignee: Teledyne Exploration Company, Houston, Tex.

[22] Filed: Oct. 24, 1975

[21] Appl. No.: 625,458

[52] U.S. Cl. .............................. 29/592; 29/203 R; 29/241; 29/407; 29/433; 254/134.3 R; 254/134.3 FT
[51] Int. Cl.[2] .......................................... H01S 4/00
[58] Field of Search ............... 29/433, 241, 421 R, 29/203 R, 592, 407, 428, 202.5, 203 D, 200 R, 169.5, 203 S, 252; 254/93 R, 93 UA, 134.3 FT, 134.3 R, 134.3 SC, 134.4; 156/294; 15/104.16, 104.06 R, 104.05

[56] References Cited
UNITED STATES PATENTS

| 646,545 | 4/1900 | Novotny | 15/104.06 R |
|---|---|---|---|
| 2,869,226 | 1/1959 | Schurman | 29/433 X |
| 3,179,375 | 4/1965 | Hamrick | 15/104.06 R X |
| 3,244,402 | 4/1966 | Ensley | 254/134.3 R |
| 3,608,710 | 9/1971 | Pugh | 254/134.3 R X |
| 3,763,896 | 10/1973 | Horne et al. | 15/104.06 R X |
| 3,778,878 | 12/1973 | Bindari | 29/421 R X |
| 3,885,286 | 5/1975 | Hill | 29/203. D |

Primary Examiner—Victor A. DiPalma
Attorney, Agent, or Firm—Murray Robinson

[57] ABSTRACT

A hydraulic reel is used to organize the streamer harness inside a tank having a nozzle. A piston attached to the harness is inserted into one end of the streamer jacket affixed to the tank nozzle. The tank is filled with a liquiform fluid, hereinafter called oil. Pressure is applied to the tank, the piston is pushed through the jacket, towing the harness. Pressure causes some jacket expansion. Initially, with the jacket in place on the nozzle, a main pump fills the tank rapidly, almost to overflow. A metering pump then fills the tank until oil enters a gage glass, indicating a full tank. A flow meter is set to zero with gage valve closed. Oil is metered into the tank, forcing the harness into the jacket. All oil entering the tank is metered until the end bulkhead is in banding position. The metering pump is reversed to extract excess oil until the required quantity is present in the jacket, as indicated by the net meter reading. The loaded section is exercised to relax the jacket skin, then is banded, trimmed and terminated.

Alternatively, when tank is full and oil is visible in gage glass, air is admitted to tank above oil to force oil and harness into jacket, oil is then metered into tank until oil is at some level in gage glass. Then gage valve is closed and requisite oil extracted from jacket by reversing meter pump as in first method.

12 Claims, 9 Drawing Figures

METHOD AND APPARATUS FOR HYDROPHONE STREAMER MANUFACTURE

BACKGROUND OF THE INVENTION

This invention pertains to method and apparatus for the manufacture of hydrophone streamers useful for seismic exploration over water. More particularly the invention relates to method and apparatus for filling such streamers with a predetermined amount of oil to achieve the desired degree of streamer buoyancy, which may be positive, negative, or neutral.

A seismic streamer comprises a cable harness inside an oil filled sheath. The sheath is a flexible plastic tube. The harness includes a plurality of hydrophones and associated electrical conductors, strain rope, spacers, and bulkheads. Method and apparatus for the manufacture of a hydrophone streamer are disclosed in U.S. Pat. No. 3,885,286 to A. C. Hill, assigned to the same assignee as the present application, the disclosure of that patent being incorporated herein by reference.

According to the disclosure of the Hill patent prior to assembly with the sheath, the harness is wound on a reel inside a pressure vessel containing oil and air. One end of the harness is fed through a spigot at the side of the vessel below the oil level and connected to a free piston which is inserted into one end of the sheath. The sheath is attached to the spigot at the side of the vessel below the oil-air interface.

The air in the tank is presurized placing the oil under pressure, and the harness and oil are fed to the sheath through the spigot. The pressurized oil forces the piston to move along the several hundred feet of sheath, pulling the harness into the sheath at a rate regulated by unwinding of the reel. The reel is actuated by a hydraulic motor.

The piston is provided with a lubricator at its leading end, a pint or so of oil being placed in the sheath before it is attached to the spigot. The sheath is initially expanded by admitting air under pressure through a check valve at the other at the other end of the sheath from the end attached to the spigot. A pressure relief valve maintains the desired air pressure in the sheath.

Since the sheath, or jacket as it is now called, expands during insertion of the harness, the precise internal volume of the jacket is variable. This results in the amount of oil in the streamer being uncertain, even though the jacket is "filled up" with oil in the process of inserting the harness, in order to get the harness all the way into the jacket and in order to eliminate air bubbles from the streamer.

It is desirable to end up with only a predetermined amount of oil and no air in the streamer, after the harness has been inserted. That is the objective of the invention.

SUMMARY OF THE INVENTION

According to the invention, instead of applying air pressure to the pressure vessel, or reel tank as it may be called, in order to force oil from the tank into the streamer jacket, the tank is filled with oil, using a large flow rate pump, while venting air from the top of the tank. The air outlet is then closed and oil injection to the tank continued, employing a small pump and flow meter. This forces oil into the streamer jacket. Or alternatively the air outlet valve is opened and air is injected to force the oil out of the tank into the jacket, and then when the jacket is full, metering oil until the tank is full again. Regardless of the method of injecting the oil, when the jacket is filled it will contain more oil than is desired, e.g. more than required for neutral buoyancy. The metering pump is then reversed to extract the excess oil through a reverse flow meter until the desired quantity of oil is present, as indicated by the net of the flowmeter readings. The jacket is then exercised to relax the jacket skin from the previous expansion. The jacket is then banded, trimmed, and terminated.

The total volume oil added to the system during the metering process is the amount necessary to replace the oil pumped into the jacket plus the amount equal to the harness volume, the latter being known, e.g. by immersion in a tank of liquid and measuring the overflow, or other equivalent displacement method. The oil added to the jacket is the difference between the total oil added and the harness volume.

It has been found that by using the method of the invention, the oil injected into the streamer jacket may be measured to about 3 percent accuracy. Accurate oil measurement requires total filling of the reel tank to eliminate air pockets.

BRIEF DESCRIPTION OF THE DRAWINGS

For a detailed description of the invention reference will now be made to the accompanying drawings wherein.

DESCRIPTION OF PREFERRED EMBODIMENT

Figure 1:
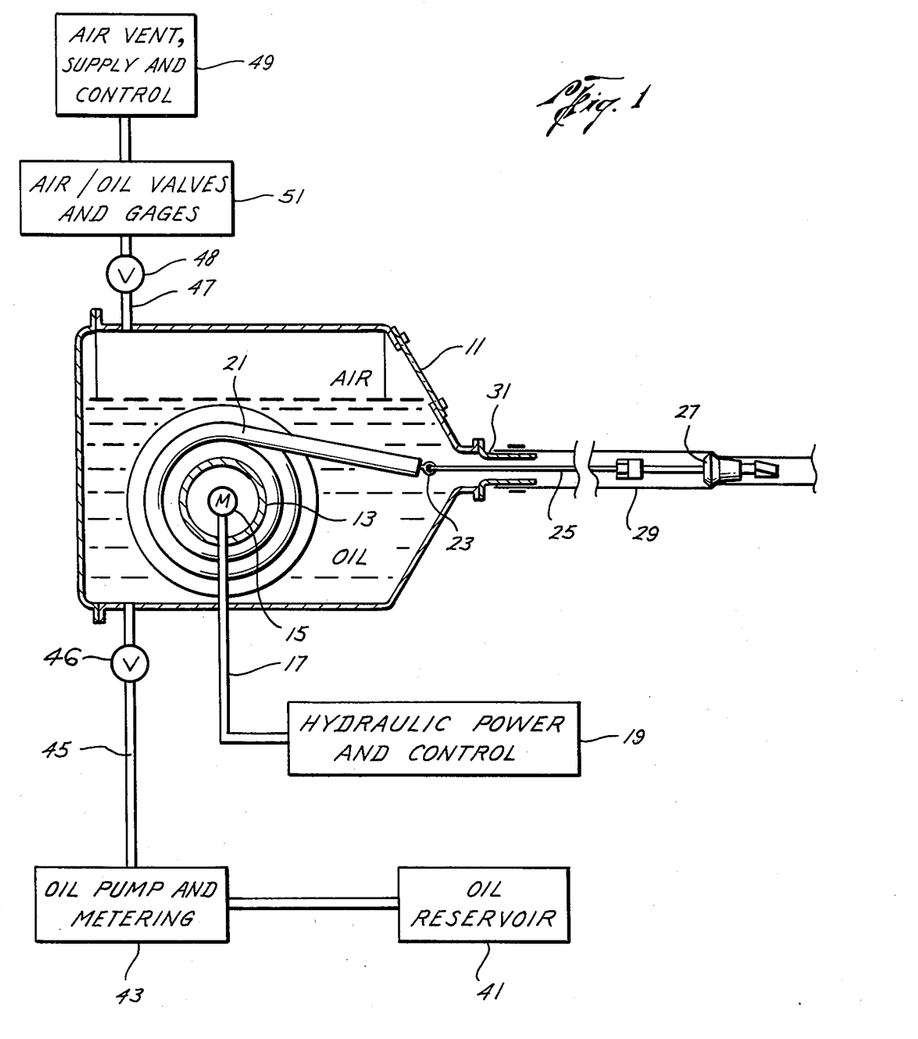
FIG. 1 is a combined vertical section and schematic view of apparatus according to the invention.

Referring now to FIG. 1, apparatus according to the invention includes a pressure vessel or reel tank 11. In the tank is rotatably mounted a reel 13. The reel is driven by hydraulic motor 15. Motor 15 is connected by plural flow passage hydraulic cable 17 to hydraulic power supply and control unit 19. On the reel is wound a hydrophone harness indicated schematically at 21. The harness is connected by eye 23 to tow line 25. The tow line is connected to the end of pilot piston 27. Piston 27 is fed into streamer jacket 29 which is attached at one end to nozzle 31 secured to the reel tank.

Oil can be supplied to the tank 11 from reservoir 41, or returned thereto, by pump and metering means 43, through flow line 45 entering near the bottom of the tank through valve 46. Air can be supplied to the tank or allowed to exit therefrom, through flow line 47 connected to the top of the tank. Line 47 connects through "gage" valve 48 to air supply and vent means 49 via air/oil valve and gage means 51.

According to the disclosure of the aforementioned Hill patent, oil was introduced into the tank 1 to a level above nozzle 31, e.g. to the level shown in FIG. 1, which is above the harness 21 and reel 13. The air pressure was built up in the top of the tank 11 to force piston 27 along jacket 29, drawing harness 21 into the jacket. According to the present improvement, the tank is initially completely filled with oil, the oil is metered into the tank and thereby forced into the streamer jacket, or air is introduced into the tank forcing the oil into the jacket and then the oil is metered into the tank to fill it. When the harness is in place in the jacket, excess oil is withdrawn in measured amount until the desired amount remains in the jacket. Apparatus for this purpose, indicated only generally in FIG. 1, is detailed in FIG. 2.

Both in the method of the Hill patent and in accordance with the present invention the harness is wound on a reel in the tank and then payed out into the streamer jacket. The hydraulic system for that purpose will be described first.

Figure 2A:
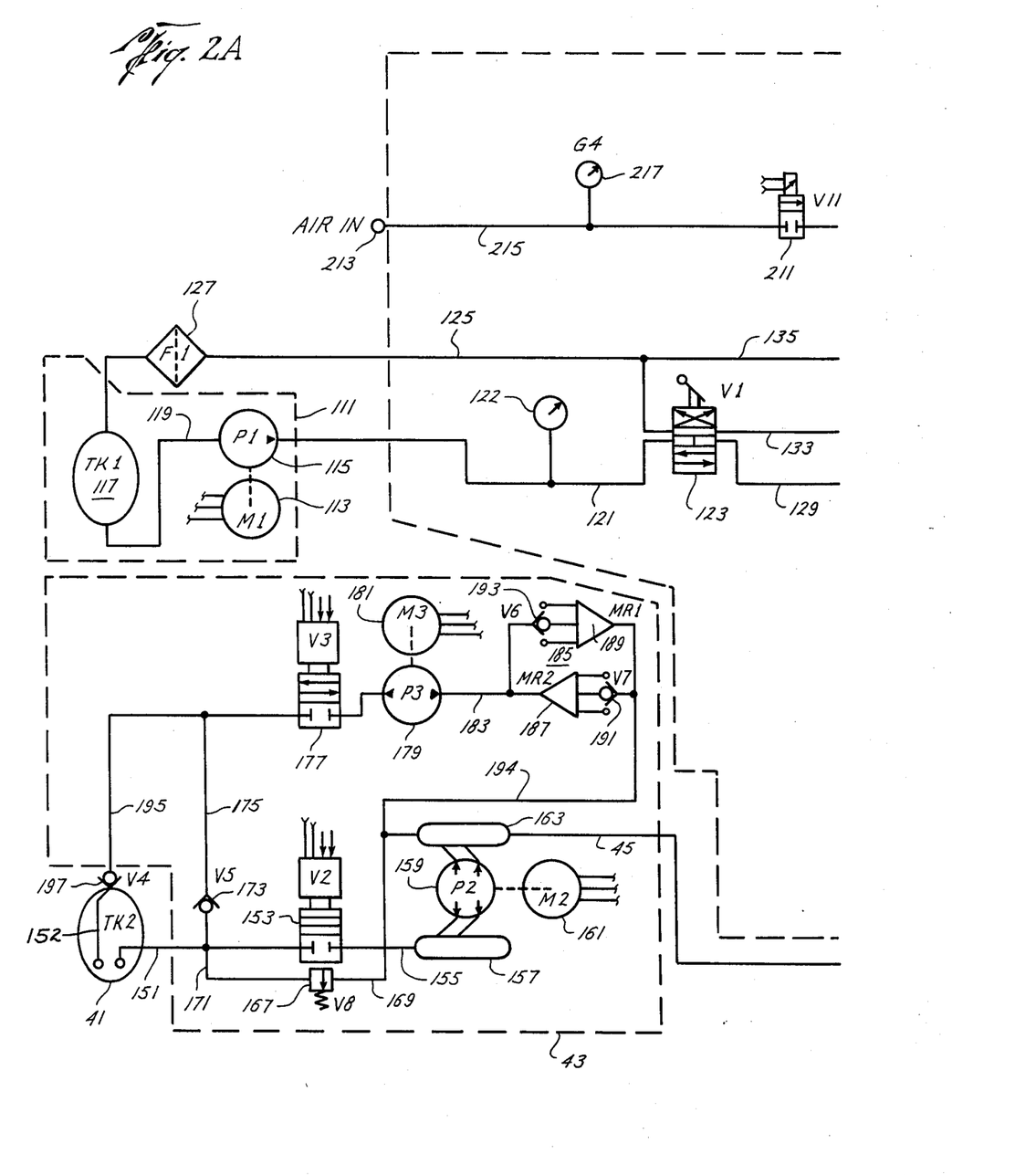
FIGS. 2A and 2B, sometimes hereinafter referred to collectively as FIG. 2, together form a schematic view of the hydraulic and pneumatic system of the invention.
Figure 2B:
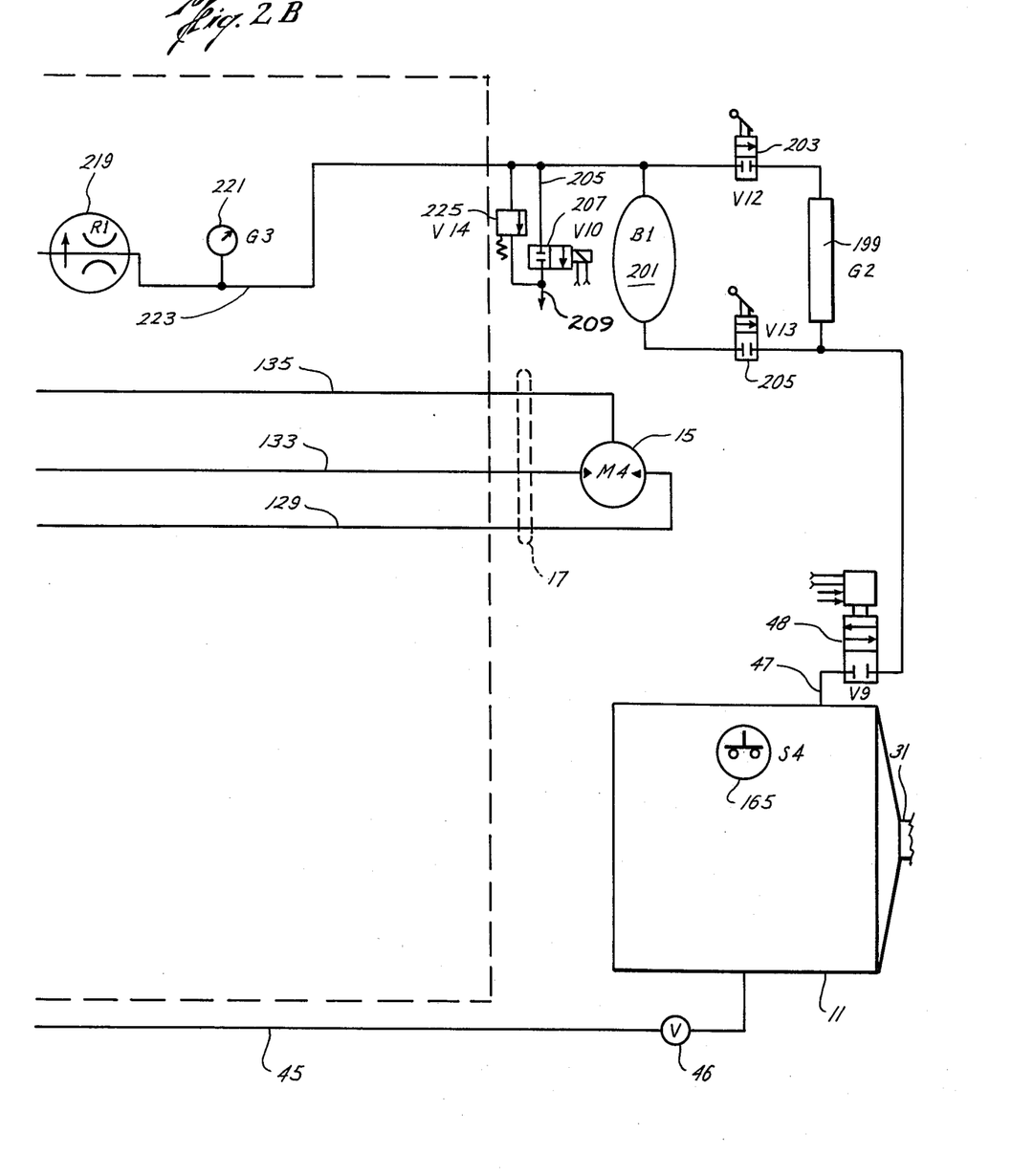
Figure 3A:
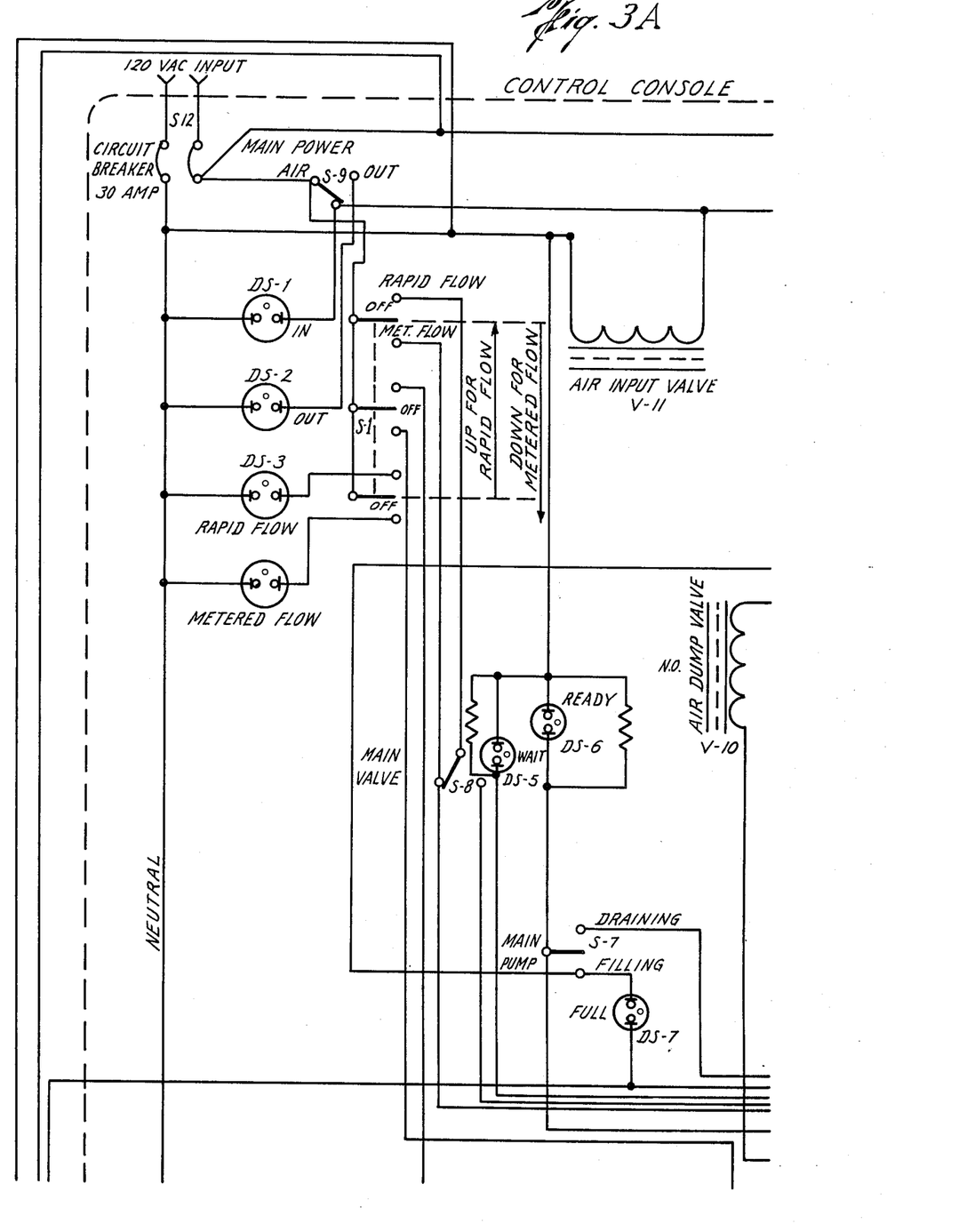
FIGS. 3A–3F, sometimes hereinafter referred to collectively as FIG. 3, together form a schematic view of the electrical system of the invention
Figure 3B:
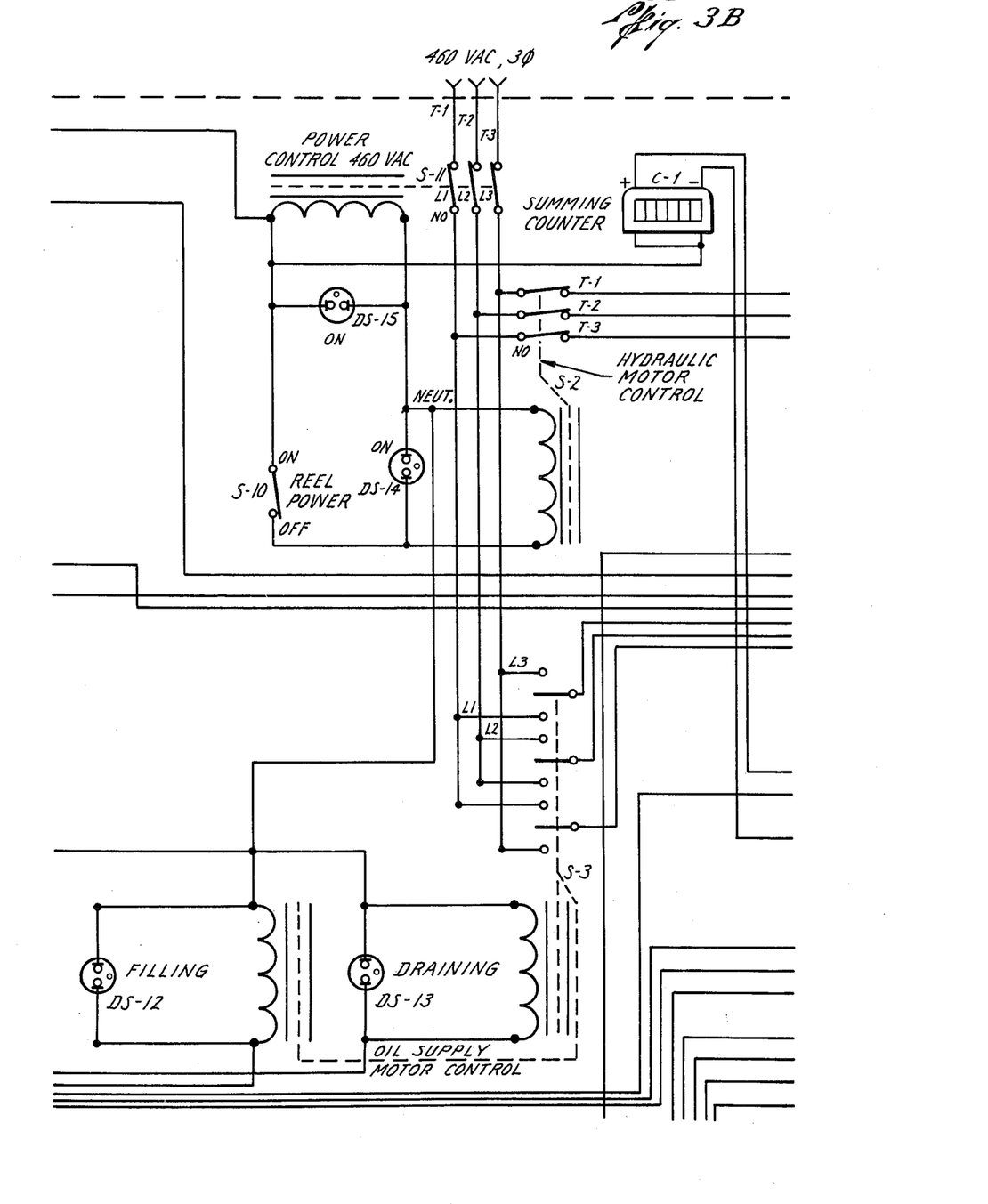
Figure 3C:
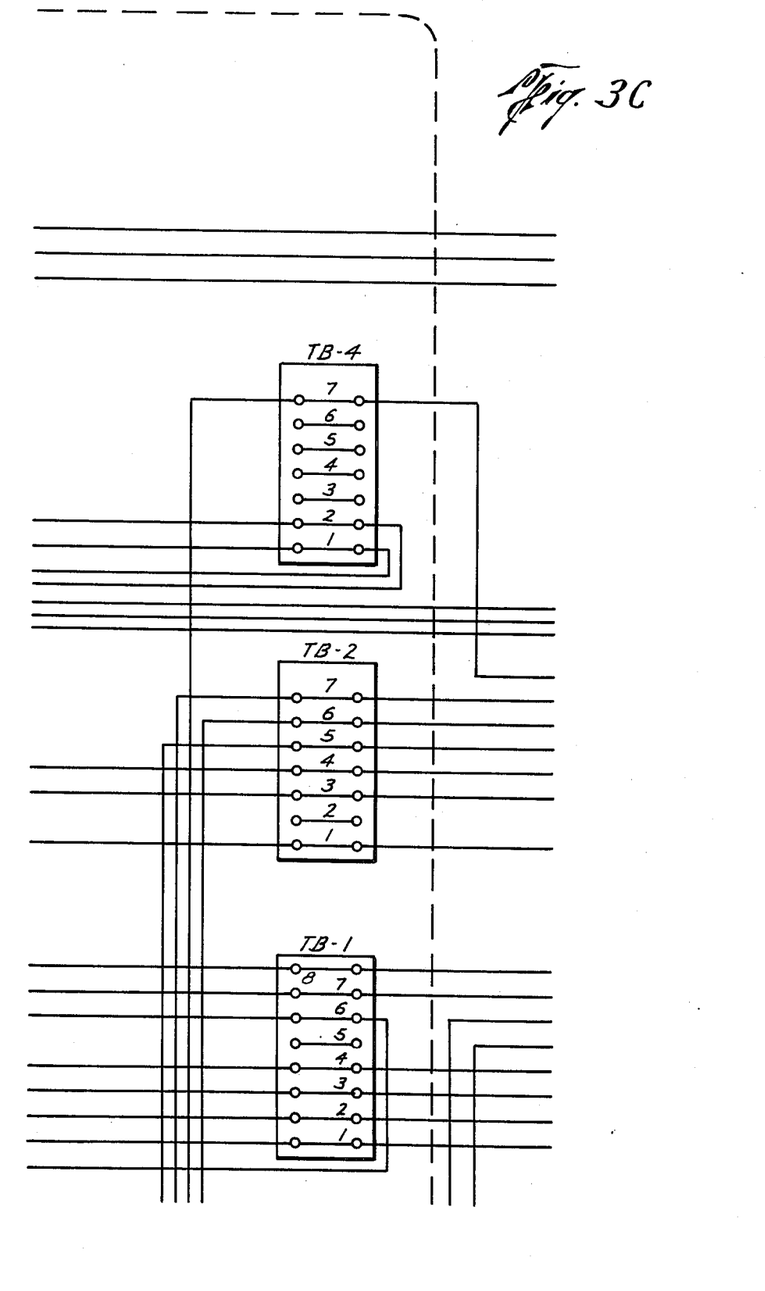
Figure 3D:
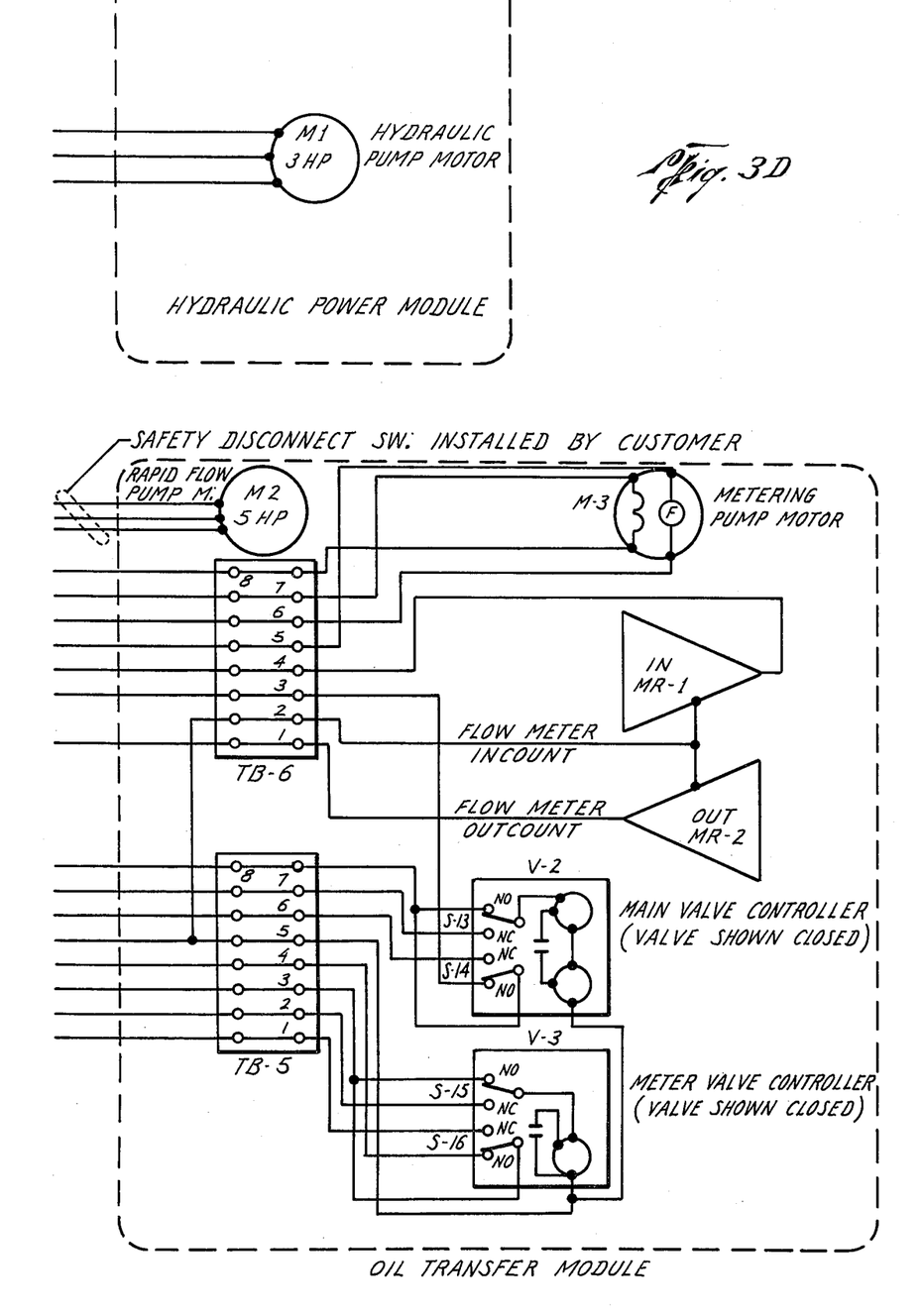
Figure 3E:
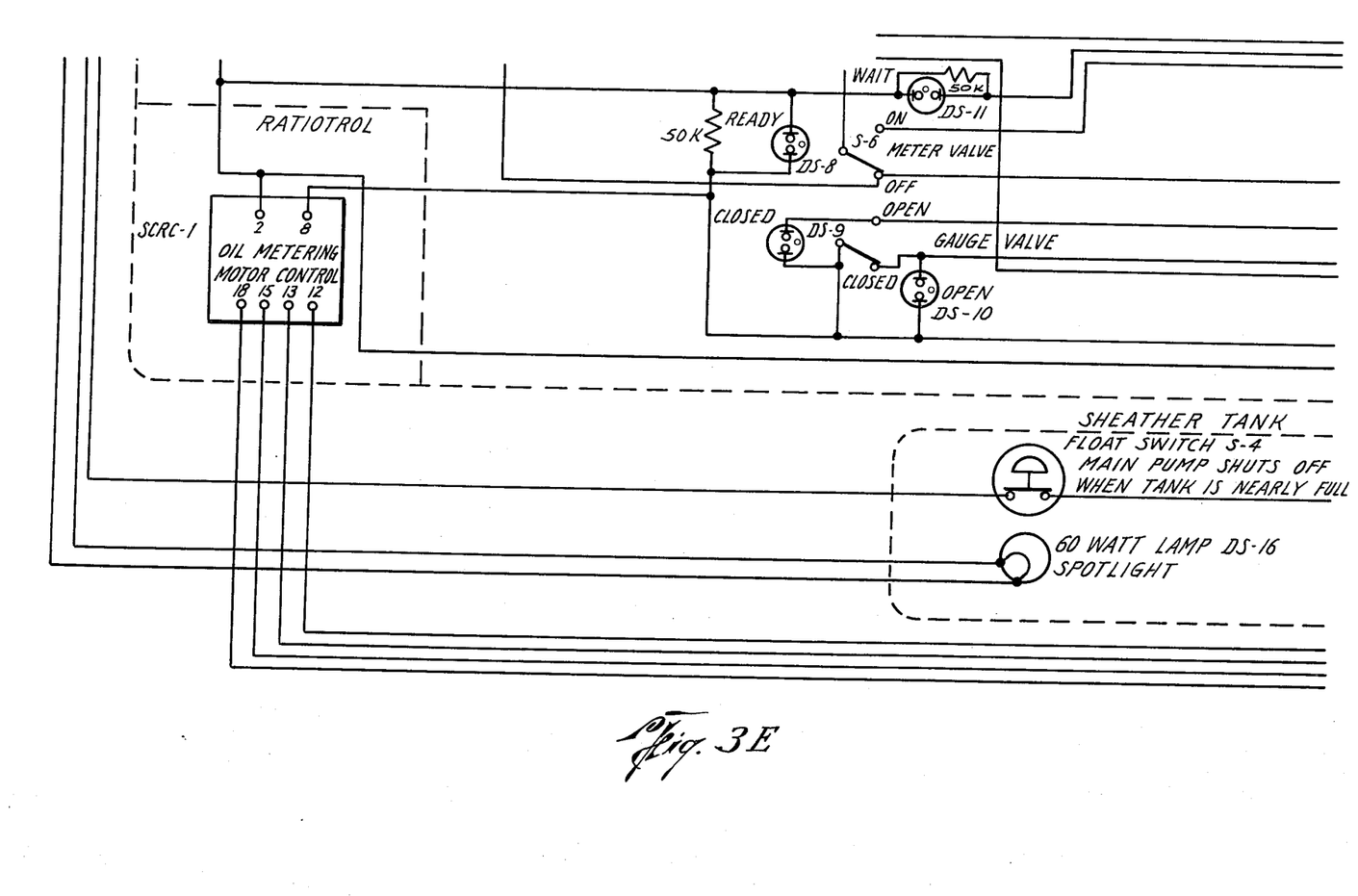
Figure 3F:
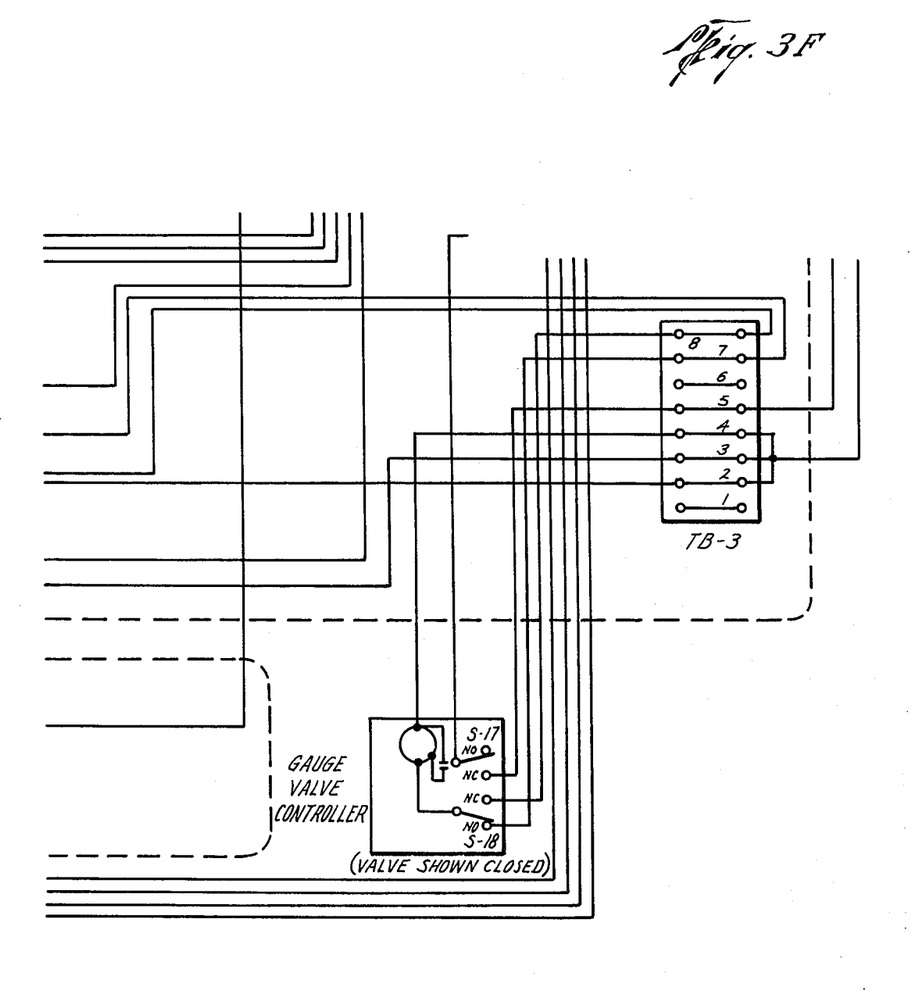

Referring now to FIG. 2 there is shown a hydraulic power unit 111, including an electric motor 113 driving a pump 115. The pump takes hydraulic fluid, e.g. a light oil, from low pressure storage tank 117 via flow line 119 and delivers it at a high pressure via line 121. Pressure gage 122 shows the pressure in high pressure line 121. Line 121 leads to 3-way manual reversing valve 123. In the neutral position shown, fluid can flow from line 121 through the valve 123 to return line 125 and filter 127 back to tank 117.

If valve 123 is shifted up, fluid flows from line 121 through valve 123 and line 129 to hydraulic powered reel motor 15, causing the motor to revolve in one direction. The fluid returns from the motor via flow line 133 and valve 123 to line 125. If valve 123 is moved down, fluid from line 121 moves through valve 123 into line 133 and thence to reel motor 15, causing the motor to revolve in the opposite direction. The fluid then returns from the motor via flow line 129 and valve 123 to line 125. At all times, excess fluid can drain from the motor 15 via flow line 135 back to line 125 and then to the reservoir tank 117.

To supply oil to the tank 11, a reservoir 41 is connected through flow line 151, electric actuated valve 153, and flow line 155 and ballasting manifold 157 to a pair of parallel hydraulic pumps 159. Pump 159 is driven by electric motor 161. From rapid fill pump 159 fluid flows through ballasting manifold 163, flow line 45, and manual valve 46 into the bottom of reel tank 11. With pump 159 actuated, the reel tank can be rapidly filled, e.g. at 100 gallons per minute. A float switch 165 is provided in the reel tank to shut off the rapid fill pump 159 automatically, in the manner hereinafter detailed with reference to FIG. 3. Oil can also be withdrawn from tank 11 by operating the rapid fill pump in reverse. Should the oil pressure in manifold 163 ever become excessive, e.g. due to operating pump 159 to fill tank 11 with valve 46 closed, pressure relief valve 167 will open allowing oil to return to the reservoir through flow lines 169, 171, and 151.

Oil can also be supplied to tank 11 from reservoir 41 through line 152, ball check valve 197, flow line 195 and electric actuated two way valve 177, by metering pump 179. Metering pump 179 is driven by variable speed electric motor 181. Pump 179 is connected by flow line 183 to two way differential flow meter means 185 which may comprise forward on fill meter 187 and reverse on drain meter 189.

Each meter is a mechanical to electric transducer providing electric output signals. Ball check valves 191, 193 limit flow through each meter to the one proper direction, toward the tank through meter 189, and away from the tank through meter 187.

Differential flow meter means 185 is connected by flow line 194 to ballasting manifold 163, so that the metering pump can pump oil to or from tank 11 via line 45 and valve 46. When oil is being withdrawn from tank 11 by the metering pump it flows back to the reservoir via flow line 175 and check valve 173.

In accordance with the invention, after a harness has been wound on reel 13, e.g. by feeding it through nozzle 31, and a pilot piston has been attached to the free end of the harness and threaded into the rear end of the streamer jacket, and the near end of the jacket connected to the nozzle 31, the rapid-fill or main pump is actuated to fill the tank to the level of the switch 165, and then the metering pump is actuated to fill the tank full, as indicated by overflow into gage glass 199. Or alternatively the tank could be filled solely with one pump, either the rapid fill pump or the metering pump. Use of the two pumps makes for faster filling initially coupled with better control finally. During such filling oil does not flow into the streamer jacket which is blocked by the piston 27 which is retained by reel 13 and reel motor 15. During such filling air is vented from the tank through "gage" valve 48, thereby insuring that all air is removed from the tank. This also prevents air pressure build up on the tank and avoids needless pressure on the streamer jacket at this time.

When oil reaches gage glass 199 it also flows into ballast tank 201 in parallel therewith. Tank 201 may, for example, be a 3 gallon tank. The capacity provided by tank 201 and glass 199 prevents the oil overflowing tank 11 from passing on beyond the gage glass before the operator can turn off the pump.

Air leaving tank 11, after passing through gage 199 and liquid valve 203, or through liquid valve 205 and ballast tank 201, leaves via flow line 205 and electric actuated two position air valve 207 to atmospheric vent line 209.

If it is desired to use air pressure to force the oil from tank 11 into the streamer jacket, air dump valve 207 can be closed when oil appears in gage glass 199, and air supply valve 211 opened. Compressed air from source 213 then passes through flow line 215, past pressure gage 217, through supply valve 211, adjustable pressure regulating orifice valve 219, and past pressure gage 221 to flow line 223. Any excess pressure, as might occur due to valve 48 being closed, is relieved by pressure relief valve 225 venting to line 209.

Air from line 223 flows through the gage means comprising tank 201 and glass 199 and thence through gage valve 48 into tank 11 to force oil into the streamer jacket, the reel 13 being actuated to pay out the harness and pilot piston 27 into the jacket. When the harness is all in place, the jacket being full of oil, the air supply valve is closed, the air dump valve 207 is opened, and the metering pump is operated to refill the tank 11 and bring the oil level back to the original level in the gage glass, the latter being provided with calibrations to facilitate determination of the oil head.

If it is desired to meter the oil into the streamer, after the tank is first filled and oil is showing in the gage glass, the gage valve 48 is closed and the metering pump operated to fill the streamer jacket with oil and harness. The situation is then the same as at the end of the air pressure filling method just described. In either case the meter shows the volume of oil pumped into the tank, which is the same as the volume of oil plus harness pumped into the jacket.

Next, with the gage valve closed, and after banding the far end of the streamer, the metering pump is reversed to withdraw excess oil in the desired amount as indicated by flow meter means 185. The metering pump is then shut off. The harness is exercised to get the jacket back to its initial unstressed condition and to

TABLE 1-continued
SWITCHES, CONTROLS, AND INDICATORS

| Item | Location | Function | Remarks |
|---|---|---|---|
| | | | valve is closed |
| V1 | Control Panel | Reel speed and direction | Variable flow, reversible, center open, w/detent |
| V2 | Oil Transfer Box | Main oil line valve | Actuated by dual motors |
| V3 | Oil Transfer Box | Metering line valve | Actuated by one motor |
| V4 | Tank Suction | Metering line backflow | Automatic |
| V5 | Oil Transfer Box | Return to main | Automatic |
| V6 | Oil Transfer Box | Metering control | Automatic |
| V7 | Oil Transfer Box | Metering control | Automatic |
| V8 | Oil Transfer Box | Safety bypass | Automatic |
| V9 | Above Sheather Tank | Gauge valve | Actuated by one motor |
| V10 | Control Box | Air pressure pump | Solenoid controlled |
| V11 | Control Box | Air input | Solenoid controlled |
| V12 | Manometer Tube | Flow control | Manual |
| V13 | Manometer Tube | Flow control | Manual |
| C1 | Control Panel | Net oil meter | Summing counter |
| R1 | Control Panel | Air regulator | Manual control Tank pressure regulator |
| DS1 | Control Panel | Air in | |
| DS2 | Control Panel | Air out | |
| DS3 | Control Panel | Rapid flow | Control section in use |
| DS4 | Control Panel | Metered flow | Control section in use |
| DS5 | Control Panel | Main valve wait | Valve in motion |
| DS6 | Control Panel | Main valve ready | |
| DS7 | Control Panel | Sheather tank full | Main pump stopped |
| DS8 | Control Panel | Meter valve ready | |
| DS9 | Control Panel | Gauge valve closed | |
| DS10 | Control Panel | Gauge valve open | |
| DS11 | Control Panel | Meter valve wait | Valve in motion |
| DS12 | Control Panel | Sheather tank filling | |
| DS13 | Control Panel | Sheather tank draining | |

3. OPERATING PROCEDURE

3.1 SAFETY

Substantial efforts were expended to safeguard operators and to minimize improper system operation. This system is not a toy, however, and requires the full attention of a competent and alert operator. Safety hazards common to all electromechanical systems handling flammable materials are present during cable sheather operations. Attention is called to the following precau- Amber indicates incomplete progress. Operator must wait for white lamp to proceed further.

Red indicates a final condition. Operator must remove the red condition before going to any other step.

Sections may be loaded by oil pressure only, by air pressure only, or by a combination of the two.

3.3.1 Oil Pressure Loading a. Switch OFF all controls at the panel.
b. Open all valves between oil supply tank and sheather.

l. Remove anti-fouling guide and attach the pilot piston (sometimes called MOUSE or PIG). Again exercise caution to ensure that all pulling stress is transmitted through stress members rather than the conductors.

m. Pour 1 pint of non-detergent oil or other desired lubricant into the end of the streamer jacket.

n. Push guide piston about 12 inches into jacket. Wind remaining harness into drum and clamp some 4 inches of jacket onto nozzle. Leave enough slack in the harness so that the pilot piston won't accidentally fall into the drum. Place a reference mark on the jacket approximately one foot from nozzle.

o. Select RAPID FLOW at selector switch.

p. Switch main valve ON. WAIT lamp will indicate until the valve has stopped in open position, at which time the white READY indicator will light.

q. Switch main pump to FILL. The tank will begin to fill at about 100 GPM. The float switch will shut off the pump when oil in tank is 4 gallons below overflow.

NOTE: The large oil supply line requires some 50 gallons to fill, so the operator won't see immediate flow if line is empty.

CAUTION

The operator should monitor operation at all times, even though the process is automatic. If the jacket clamp slips or if the nozzle becomes disconnected from any cause, oil will spill until the level is below the half-full point. For a full tank, this means 400 gallons.

In case of spillage, the operator should immediately switch the main pump to DRAIN. The pump is large enough to hold a vacuum on the nozzle, and can totally prevent spillage.

r. Switch main valve OFF when FULL lamp lights to prevent gravity drainage back to supply tank.

s. Switch selector to METERED FLOW.

t. Switch meter valve ON. Observe WAIT signal and proceed when READY lamp lights.

u. Switch SCR controller to FWD. Move speed control clockwise to start metering pump. Flow meter will count up when pump is running forward. Meter approximately 5 gallons of oil into sheather tank, using speed control and REV/FWD switch to set oil level in sight glass to ZERO.

v. Switch guage valve to CLOSED, sealing tank full of oil.

w. Slowly add oil with metering controls, observing increased tank pressure as indicated by swelling of the jacket at nozzle. Operate reel throttle to OUT, allowing harness to slacken and unwind from drum. As pressure increases, the pilot piston will begin to move through the jacket.

x. ZERO flow meter when the end bulkhead passes reference mark (n, above). Some air is usually entrapped during the starting process, and may be worked back into the sheather at this point.

y. Meter oil into the tank and simultaneously pay out harness, manually adjusting oil flow rate and reel speed to keep harness from developing excessive slack on the reel, and to limit jacket expansion to about 100 percent.

NOTE: Jacket elongation is normal, but can be minimized by loading the harness as rapidly as possible.

z. One technician should check the pilot piston's progress, and should keep the empty jacket straight ahead of the piston.

aa. When the trailing end bulkhead reaches the reference mark, band the leading end, trim jacket to length, and return piston to the sheather.

bb. The meter reading at this point will equal the volume of the harness assembly plus the volume of oil contained in the jacket. The oil volume will be somewhat greater than desired because the loading operation involves jacket pressurization.

cc. Reverse metered flow, slowly removing oil from the jacket until the net meter count reaches the volume previously determined correct for that particular assembly. (Remember that indicated volume includes oil plus harness volume.) Oil removal will apply vacuum to the jacket, causing it to collapse near the nozzle. It is necessary to adjust flow rate to match the rate at which oil can bleed past the end bulkhead, preventing total collapse of the jacket and oil flow stoppage.

dd. When meter count reaches the desired volume, allow some two minutes for pressures to equalize, then band the end bulkhead.

ee. OPEN guage valve.

ff. CLOSE meter valve.

gg. Select "RAPID FLOW".

hh. OPEN main valve.

ii. Start main pump to DRAIN. As the tank drains, the jacket section at the nozzle will collapse due to vacuum, and eventually the oil will begin to effervesce.

jj. Back air regulator to low pressure.

kk. Switch air "IN".

ll. Regulate air pressure to prevent jacket collapse, which means air volume in will equal oil volume being removed by the pump.

mm. Drain tank until oil level is below the nozzle.

nn. Tilt jacket to pour oil back into tank.

oo. Cut and trim jacket.

pp. Return controls to starting condition.

3.3.2 Air Pressure Loading (Oil Filled)

This method provides end results similar to those obtained by oil pressure loading (3.3.1 above), and ordinarily would be used only to cross-check results.

a. Refer to and follow instructions 3.3.1, a) through u), Page 7. At this point, the harness is ready to load into the jacket, the sheather tank is filled with oil, and the oil level in the sight glass has been set at exactly ZERO.

b. Switch SCR control OFF.

c. Close meter valve.

d. Back air regulator off to ensure low starting pressure.

e. Switch air valve IN.

f. Adjust regulator to increase pressure until the piston starts to move. Pay out harness as required, keeping slack from forming on reel.

NOTE: Air pressure regulation should be balanced to keep the piston moving at a fairly rapid rate, while limiting jacket expansion at the nozzle to less than 100 percent.

g. Continue loading under air pressure until the end bulkhead arrives at the reference mark.

h. Band and trim leading end of the assembly.

i. Open meter valve.

j. ZERO net oil meter.

k. Use SCR control to meter oil back into the sheather tank, replacing the volume injected into the jacket. Refill tank and adjust level in sight glass to ZERO. The volume shown on the meter at this point will equal harness volume plus the volume of oil in the jacket. The total volume will be greater than desired.

l. Close guage valve.

m. Operate meter pump in REV mode, very slowly, to extract excess oil from the assembly. Adjust flow rate to prevent total collapse of the jacket at the nozzle. Stop when net oil indication reaches the desired volume.

n. Refer to and follow steps dd through pp of Section 3.3.1, pages 10 and 11 above.

3.3.3 Air Pressure Loading (Dry)

This method is used to load sections free of oil.

a. Switch OFF controls at the panel.
b. Close oil supply valve at foot of sheather.
c. Close waste oil bypass.
d. Refer to and follow steps d through n, 3.3.1, page 7.
e. Proceed to steps d through h, 3.3.2, page 11.
f. When end bulkhead arrives at the reference point, switch air OUT to relieve pressure on tank and jacket.
g. Band jacket and proceed to next assembly.

4. MAINTENANCE

4.1 PREVENTIVE MAINTENANCE

The following items should be inspected weekly and corrective measures be taken as indicated.

A. Check fluid level in the reel power unit. Refill with good grade hydraulic fluid as required.

B. Check pressure guage on the hydraulic filter with power unit in operation. Replace filter cartridge when indicated.

C. Check water level in oil supply tank. Evacuate water as required.

| ITEM | QUAN | PART NUMBER | MANUFACTURER | PART NAME | SPECIFICATIONS |
|---|---|---|---|---|---|
| P-2 | 1 | 37X | Commercial Shearing Co. | Pump | 100 GPM Rapid Transfer |
| P-3 | 1 | PM110PA | BE-GE Mfg. Co. | Pump | 20 GPM Metering |
| R-1 | 1 | 8804P | REGO Regulators | Air Regulator | |
| S-1 | 1 | 82614 | Arrow Hart Switches | Toggle Switch | 3PDT Center Off |
| S-2 | | | | | |
| S-11 | 2 | CR206-C102 | Gen. Electric | Motor Starter | |
| S-3 | 1 | 8702-SB04 | Square D Co. | Contactor | A.C. Reversing |
| S-4 | 1 | L-166-S | Worcestor Controls | Switch | Level Control |
| S-5 | | | | | |
| S-6 | 2 | 512TS1-3 | Micro Switch | Toggle Switch | DPDT |
| S-8 | | | | | |
| S-9 | 2 | 512TS1-3 | Micro Switch | Toggle Switch | DPDT |
| S-7 | 1 | 512TS1-1 | Micro Switch | Toggle Switch | DPDT Center Off |
| S-10 | 1 | 511T31-2 | Micro Switch | Toggle Switch | SPST |
| S-12 | 1 | 190-230-101 | Wood Electric Div., Potter & Brumfield | Breaker | Main Circuit |
| SCRC-1 | 1 | 63304VE75SR | Boston Gear Ratiotrol | Motor | D.C.S.C.R.Speed Control |
| TB-1 thru TB-6 | 6 | 8-141 | Cinch | Terminal Strips | |
| TK-1 | 1 | UNNT9-854296-KS | BeGe | Reservoir | Hydraulic Oil |
| V-1 | 1 | SM1200-OC | BeGe Mfg. Co. | Hydraulic Reel | For Control Valve |
| V-2 | 1 | 2"-444TSE w/B35-5-110/60 | Worcester Miser Valve | Valve | Main Rapid Flow Cntl. |
| V-5,6,7 | 3 | 320A1.0-5 | Rex Roth Mer. Co. | 1" Check Valves | For Metering Lines |
| V-8 | 1 | 1½" Model T | Lonelgan | Valve | Rapid Flow Relief Set at |
| V-10 | 1 | 8210B34 | Automatic Switch Co. | ASCO ½ Valve | Normal,Open,Air,Out |
| V-14 | 1 | 25B3 | Deltrol | Relief Valve | ⅜" Pressure(Safety) |
| | | Type E | Dodge | Bearing | Pillow Block 1 15/16" Shaft |
| | 1 | 1115-JSC-20 | Falk Corp. | Screw Conveyor | |
| | 1 | 2P1488C | Borg-Warner | Mounting Bracket | S.A.E. |
| | 1 | 40B 36 Tooth | Dodge | Sprocket | |
| | 1 | 40B 11 Tooth | Dodge | Sprocket | |
| | 1 | 40 Pitch | Dodge | Chain | |
| | | CR123-C8-67A | Gen. Electric | Heater Fuses | For Motor Starters |
| | | 312- | Bombo Mfg. Co. | Air Cylinder | For Jacket Stretcher |
| | | No. 346 | Parker "O" Ring | "O" Ring | For Jacket Nozzle |
| DS-1 thru 15 | 15 | 95-0463-09-112 | Dialco Indicator Lights | Lamp Holders | |
| DS-1 thru 15 | 15 | B2A | Dialco Indicator Lights | Neon Lamps | Color Clear |
| DS-1,9 | 2 | 95-0931 | Dialco Indicator Lights | Lamp Lens | Color Red |
| DS 2,3,4,6,8,10 12,13,14 15 | 10 | 95-0935 | Dialco Indicator Lights | Lamp Lens | Color White |
| DS-7 5,11 | 3 | 95-0933 | Dialco Indicator Lights | Lamp Lens | Color Amber |
| C-1 | 1 | G0431-489-1 | Hecon Corp. | Counter | |
| F-1 | 1 | DP-750-30G | | Line Filter Holder | |
| F-1 | 1 | A40147 | | Line Filter Element | |
| G-1 | 1 | Type 213-2½" | Wika Pressure Gages | Hydraulic Gage | 0-1500,Flange Mount |
| G-3 | 1 | Type 213-2½" | Wika Pressure Gages | Tank Pressure Gage | 0-100,Flange Mount |
| G-4 | 1 | Type 213-2½" | Wika Pressure Gages | Air Supply Gage | 0-300,Flange Mount |
| M1 | 1 | 4543 | US Motors | Marine Duty Motor | 3HP,T.E.F.C.1750 RPM |
| M2 | 1 | 3496 | US Motors | Marine Duty Motor | 5HP,T.E.F.C.1750 RPM |
| M3 | 1 | V97500TF | Boston Gear | DC Motor | ¾ HP |
| M4 | 1 | M15-5 | Borg Warner | Hydraulic Motor | |
| MR-1, MR-2 | 2 | 01D15 | Niagara-Hersey Prod.Inc. | Motor | Liquid Flow |
| MR-1 MR-2 | 2 | 121AO | Niagara-Hersey Prod.Inc. | Transmitter | Impulse 120VAC 60 Cy |
| P-1 | 1 | S15-5 | Borg Warner | Pump | Hydraulic |

While preferred embodiments of the invention have been described, many variations will occur to one skilled in the art without departing from the spirit of the invention. For example, throughout the description the material used to fill the streamer jacket has been referred to as oil. However, other liquiform fluids could be used, such as water, or oil with additives.

I claim:

1. Method of streamer manufacture comprising reeling a harness in a tank having a nozzle,
placing a pilot piston and the free end of the harness into a streamer jacket, the piston being connected to the harness end,
connecting the near end of the streamer jacket to the nozzle,
filling the tank with liquiform fluid while the piston is stationary and while venting air from the tank,
causing such fluid to move from the tank into the jacket to move the pilot piston along the jacket while paying out the harness into the jacket, and
metering such fluid into the tank sufficient so that the tank is full of such fluid despite the movement of such fluid into the jacket.

2. Method of claim 1,
said pilot piston, liquiform fluid, and harness being moved into the streamer jacket by air under pressure admitted to the tank above the liquiform fluid,
said metering of liquiform fluid into the tank being effected after the harness is fully in the jacket.

3. Method of claim 1,
said metering of liquiform fluid into the tank being effected while the harness and such fluid are moving into the jacket and being the cause of such moving, the tank being maintained full of such fluid at all times during said moving of the harness.

4. Method of claim 1, including
metering liquiform fluid out of the tank after the tank is full of such fluid, the tank being otherwise closed except at the nozzle, thereby to withdraw such fluid from the streamer jacket until only a predetermined desired amount of such fluid remains in said jacket.

5. Method of claim 2 including
metering liquiform fluid out of the tank after the tank is full of such fluid, the tank being otherwise closed except at the nozzle, thereby to withdraw such liquiform fluid from the streamer jacket until only a predetermined desired amount remains therein.

6. Method of claim 3, including:
metering such liquiform fluid out of the tank after the tank is full of such fluid, the tank being otherwise closed except at the nozzle, thereby to withdraw such fluid from the streamer jacket until only a predetermined desired amount of such fluid remains in said jacket.

7. Apparatus for streamer manufacture, comprising:
a tank having a nozzle adapted for attachment of a streamer jacket and with a motor driven harness reel inside the tank,
fluid passage means at the top of the tank for introduction and withdrawal of fluid from the top of the tank,
valve means controlling flow through said fluid passage means,
pump means for introducing liquiform fluid into the tank, and
meter means for measuring the amount of liquiform fluid so introduced into the tank.

8. Apparatus according to claim 7,
said pump means also providing for withdrawal of such liquiform fluid from the tank,
said meter means also providing for measuring the amount of such liquiform fluid withdrawn from the tank.

9. Apparatus according to claim 8, including:
gage means in said fluid passage means,
said valve means being between said gage means and said tank.

10. Apparatus according to claim 9,
said gage means including a sight gage and a ballast tank in parallel.

11. Apparatus according to claim 9, including:
air supply means connected to said fluid passage means.

12. Apparatus according to claim 8,
said pump means including rapid fill pump means and variable flow pump means.

* * * * *

UNITED STATES PATENT AND TRADEMARK OFFICE
CERTIFICATE OF CORRECTION

PATENT NO. : 3,987,537
DATED : OCTOBER 26, 1976
INVENTOR(S) : NOEL MACON WARREN

It is certified that error appears in the above-identified patent and that said Letters Patent are hereby corrected as shown below:

Column 1, line 30, change "presurized" to -- pressurized --.

Column 1, line 41, delete the second occurrence of "at the other".

Column 11, line 8, change "guage" to -- gauge --.

Signed and Sealed this

Twenty-ninth Day of March 1977

[SEAL]

Attest:

RUTH C. MASON
*Attesting Officer*

C. MARSHALL DANN
*Commissioner of Patents and Trademarks*